United States Patent
Glickman

(10) Patent No.: US 7,643,182 B2
(45) Date of Patent: Jan. 5, 2010

(54) SYSTEM AND METHOD FOR PROCESSING IMAGE DATA

(75) Inventor: Jeff Glickman, Las Vegas, NV (US)

(73) Assignee: Seiko Epson Corporation, Suwa-shi, Nagano-ken (JP)

( * ) Notice: Subject to any disclaimer, the term of this patent is extended or adjusted under 35 U.S.C. 154(b) by 1003 days.

(21) Appl. No.: 11/012,984

(22) Filed: Dec. 14, 2004

(65) Prior Publication Data

US 2005/0163386 A1 Jul. 28, 2005

Related U.S. Application Data

(60) Provisional application No. 60/530,452, filed on Dec. 16, 2003.

(51) Int. Cl.
*H04N 1/04* (2006.01)

(52) U.S. Cl. .................. 358/474; 358/539; 358/426.07; 358/426.03

(58) Field of Classification Search ................. 358/474, 358/539, 426.07, 426.03; 382/232, 233
See application file for complete search history.

(56) References Cited

U.S. PATENT DOCUMENTS

| | | | |
|---|---|---|---|
| 4,719,885 A * | 1/1988 | Nagano et al. | 123/179.17 |
| 5,825,934 A * | 10/1998 | Ohsawa | 382/246 |
| 6,295,376 B1 * | 9/2001 | Nakaya | 382/236 |
| 6,310,962 B1 * | 10/2001 | Chung et al. | 382/100 |
| 6,860,609 B2 | 3/2005 | Olson et al. | |
| 2001/0033404 A1 | 10/2001 | Escobosa et al. | |
| 2002/0012433 A1 | 1/2002 | Haverinen et al. | |
| 2003/0017846 A1 | 1/2003 | Estevez et al. | |
| 2003/0117587 A1 | 6/2003 | Olson et al. | |

OTHER PUBLICATIONS

Babel et al., *Lossless and lossy minimal redundancy pyramidal decomposition for scalable image compression technique*, UMR CNRS 6164 IETR Groupe Image ICASSP 2003, pp. 249-252.

You et al, *Pyramidal image compression using anisotropic and error-corrected interpolation*, Department of Electrical Engineering, University of Minnesota.

Pettelkau, Jeff. Toshiba TDP-SW20 Wireless DLP Projector. Oct. 2004 [retrieved on Mar. 15, 2007]. Retrieved from the Internet: <URL: http://www.jiwire.com/toshiba-TDP-SW20-wireless-projector-photo-image-gallery.htm>.

* cited by examiner

*Primary Examiner*—Houshang Safaipour
(74) *Attorney, Agent, or Firm*—Townsend and Townsend and Crew, LLP

(57) ABSTRACT

In one embodiment, a method of processing image data for compression is provided, wherein the image data represents an image and includes a plurality of image data values, each image data value representing an appearance characteristic of a pixel of the image. In one embodiment, the method includes determining a variance between n image data values, comparing the variance to a variance threshold to determine whether the variance meets a preselected condition relative to the variance threshold, and if the variance meets the preselected condition, then changing at least one of the n image data values to reduce the variance.

28 Claims, 3 Drawing Sheets

SYSTEM AND METHOD FOR PROCESSING IMAGE DATA

CROSS-REFERENCE TO RELATED APPLICATION

The present application claims priority from U.S. Provisional Patent Application Ser. No. 60/530,452 filed Dec. 16, 2003, hereby incorporated by reference in its entirety for all purposes.

TECHNICAL FIELD

The present disclosure relates generally to apparatus, systems and methods for processing image data.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION OF THE DEPICTED EMBODIMENTS

Image processing, transmission and display devices may be used to process, transmit and display many different types of image data. For example, two types of image data used with these devices are computer graphics image data and non-computer graphics image data. Computer graphics image data is typically generated by software on a computing device, and includes such images as those displayed by personal computer productivity software applications. In contrast, non-computer graphics image data is image data generated by the capture of an image of a real-world object via an analog or digital still camera, video camera, scanner, etc.

Computer graphics image data tends to have sharp boundaries between regions of different colors, intensity levels or other appearance characteristics. In contrast, non-computer graphics image data may have less precise boundaries between colors, etc., and thus may include pixels having relatively low color and/or intensity variances compared to adjacent pixels in these boundary regions.

Due at least in part to the differences in the sharpness of borders between regions of different colors, etc., computer graphics image data and non-computer graphics image data may not be compressed equally efficiently by a selected compression algorithm. For this reason, some image compression devices are configured to compress computer graphics image data and non-computer graphics image data with different compressors. In order to do so, these devices may attempt to detect whether data in a set of image data is computer graphics image data or non-computer graphics image data. However, these systems may misidentify data, and therefore use the wrong compressor to compress the data. Such identification errors may lead to reduced compression efficiencies, and thus may interfere with the real-time compression and transmission of image data.

Figure 1:
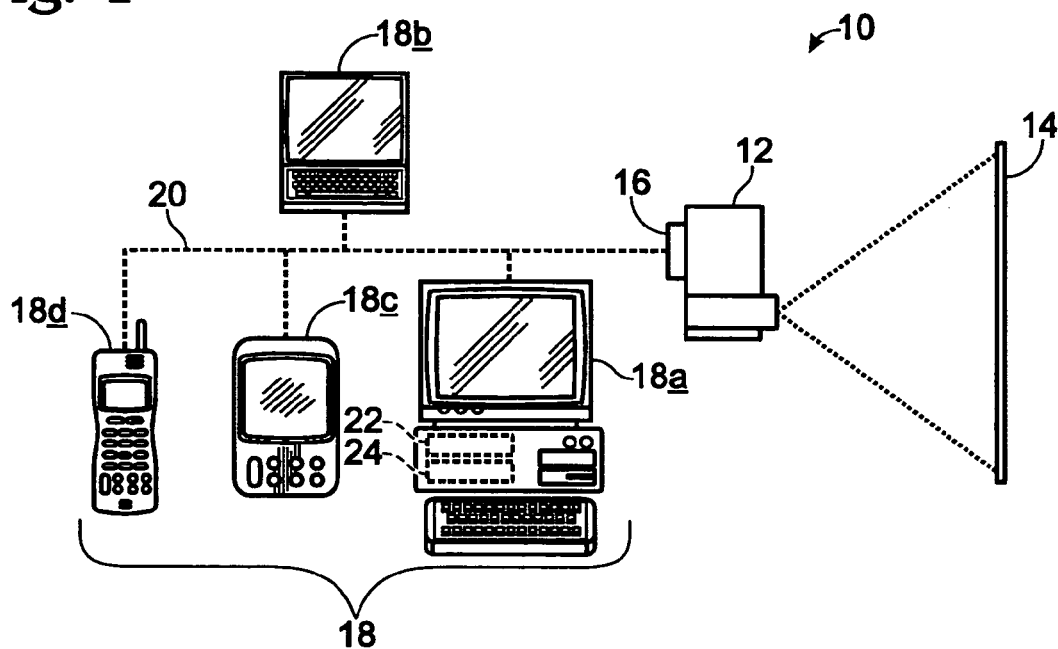
FIG. 1 is a schematic depiction of an image data processing system according to one embodiment.

FIG. 1 shows, generally at 10, a schematic depiction of an image processing system according to a first embodiment. Image processing system 10 includes an image display device 12 configured to display an image on a viewing surface 14. Image display device 12 may be any suitable type of image display device. Examples include, but are not limited to, liquid crystal display (LCD) and digital light processing (DLP) projectors. Furthermore, it will be appreciated that other types of display devices may be used in place of image display device 12. Examples include, but are not limited to, television systems, computer monitors, etc.

Image processing system 10 also includes an image-rendering device 16 associated with image display device 12, and one or more image sources 18 in electrical communication with image-rendering device 16. Image-rendering device 16 is configured to receive image data transmitted by image sources 18, and to render the received image data for display by image display device 12. Image-rendering device 16 may be integrated into image display device 12, or may be provided as a separate component that is connectable to the image display device. An example of a suitable image-rendering device is disclosed in U.S. patent application Ser. No. 10/453,905, filed on Jun. 2, 2003, which is hereby incorporated by reference.

Image sources 18 may include any suitable device that is capable of providing image data to image-rendering device 16. Examples include, but are not limited to, desktop computers and/or servers 18a, laptop computers 18b, personal digital assistants (PDAs) 18c, mobile telephones 18d, etc. Additionally, image sources 18 may communicate electrically with image-rendering device 16 in any suitable manner. In the depicted embodiment, each image source 18 communicates electrically with image-rendering device 16 over a wireless network 20. However, image sources 18 may also communicate with image-rendering device 16 over a wired network, over a wireless or wired direct connection, etc. Typically, each image source 18 includes memory 22 for storing code executable by a processor 24 on each image source for performing image production, display, compression, transmission, and other such tasks. While memory 22 and processor 24 are depicted only on desktop computer 18a for purposes of clarity, it will be appreciated that all of the other depicted image sources 18 also typically include memory and processors.

As described above, each image source 18 may be configured to display image data of many different types and formats. Thus, in order to allow the display of all of the types and formats of image data that are supported by image sources 18, image-rendering device 16 may be configured to decompress and otherwise process image data of many different formats. However, this may require installing on image-rendering device 16 software for processing image data of each desired format.

In order to simplify the operation of, and software requirements for, image rendering device 16, each image source 18 may include software configured to generate a bitmap of an image displayed on each image source. This software may also be configured to compress at least some portions of the bitmap, and to transmit the compressed bitmap to image-rendering device 16 for display by image display device 12. Such an image capture, compression and transmission scheme offers the advantage that image-rendering device 16 may include software for receiving and decoding image data of only a single format.

However, if only a single type of compressor is used on image sources 18 to compress both computer graphics and non-computer graphics image data, the software may not achieve satisfactory compression of both of these types of images due to the different characteristics of these types of image data. Furthermore, where separate compressors are used to compress computer graphics images and non-computer graphics images, software must be used to determine which type of image a selected image is. Mistakes in image type identification may cause images to be compressed with the wrong compressor, leading to compression inefficiencies and possible performance problems. This may especially pose problems in the real-time transmission of video data from image sources 18, which may require the compression and transmission of data at a rate of approximately 25 frames/second or more.

Figure 2:
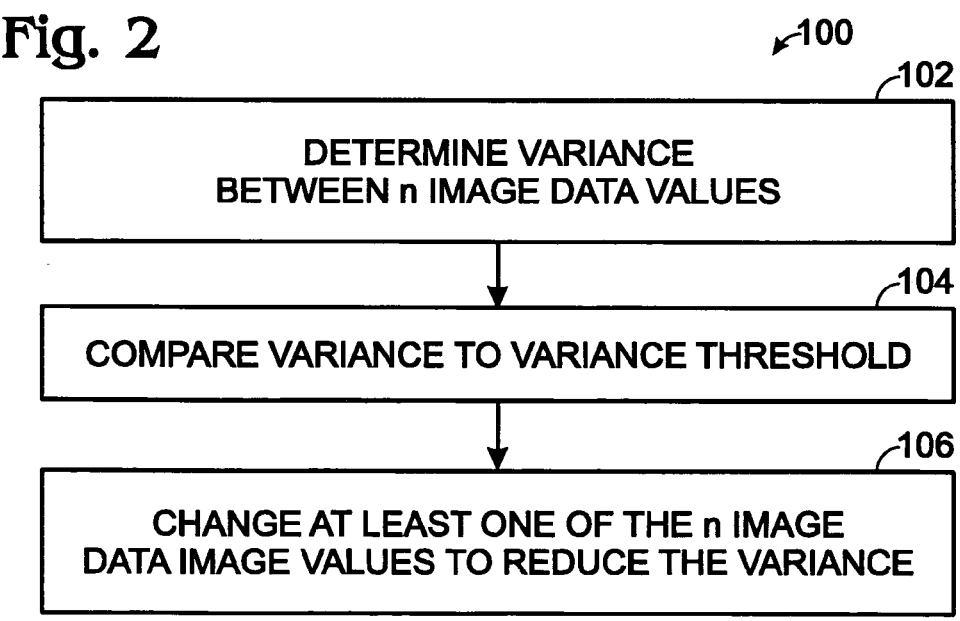
FIG. 2 is a flow diagram of a method of processing computer graphics image data and non-computer graphics image data according to another embodiment.

To avoid such compression problems, image sources 18 may be configured to change non-computer graphics image data into a form more closely resembling computer graphics image data, and then to use a computer graphics image data compressor to compress both types of image data. FIG. 2 shows, generally at 100, an exemplary embodiment of a method of processing graphics image data for changing non-computer graphics image data into a form more closely resembling computer graphics image data. Method 100 is typically carried out by code stored in memory 22 that is executed by processor 24 on each image device.

Method 100 includes determining, at 102, a variance between n image data values in a set of image data values representing an image. The n image data values in the set of image data values represent colors, intensities or other appearance characteristics of the image at the pixels in the image. The variance may be determined simply by determining a difference between adjacent image data values, or in any other suitable manner.

Next, method 100 includes, at 104, comparing the variance to a variance threshold to determine whether the variance meets a preselected condition relative to the variance threshold. The variance threshold typically corresponds to a variance between colors, intensities, etc. that is outside of the range of perception of the human eye. The preselected condition may be defined as being below such a variance threshold, equal to or below such a variance threshold, or in any other suitable manner.

If the variance meets the preselected condition, then method 100 includes, for example, changing at least one of the n image data values to reduce the variance between the n image data values. The variance may be reduced to any suitable degree, and in any suitable manner. For example, where the variance meets the preselected condition, the variance may be reduced to zero by changing one or more of the n image data values to be equal to one or more other image data values. If, on the other hand, the variance does not meet the preselected condition (or if the variance is zero) then none of the n image data values is changed.

The effect of such a change is to replace more gradual transitions between areas of different colors and/or color intensities in an image with sharper transitions. Because only adjacent pixels with differences in appearance below a perception threshold are changed, the impact of the changes on the appearance of the image may be negligible. The greatest number of changes may be made to regions of non-computer graphics image data adjacent to boundaries between colors, intensities, and/or other appearance characteristics of an image. Reducing the variances between pixels in these parts of an image makes the image more closely resemble computer-graphics images, which typically have sharper, more precise boundaries between images of different colors, color intensities, etc. This may allow compressors best suited for compressing computer graphics image data to compress the modified non-computer graphics image data with satisfactory compression efficiencies.

Figure 3:
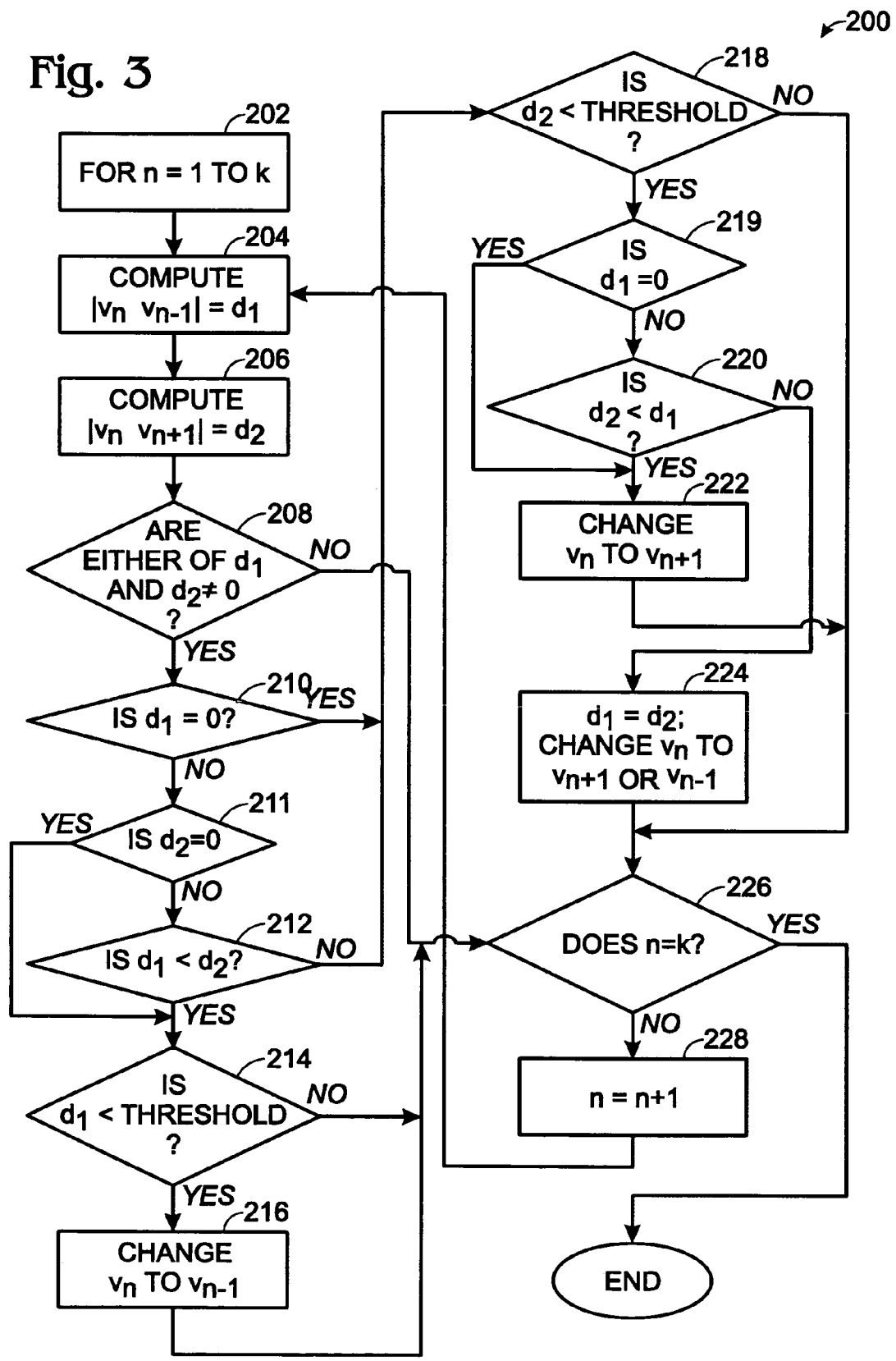
FIG. 3 is a flow diagram of a method of processing computer graphics image data and non-computer graphics image data according to yet another embodiment.

Method 100 may be implemented in any suitable manner. FIG. 3 shows, generally at 200, a flow diagram of one exemplary implementation of method 100. Method 200 is typically performed iteratively through most or all of the values in a set of image data (where each image data value in the set of image data values represents an appearance characteristic at a single pixel). Thus, method 200 may include initializing a counter n=1 at 202. Method 200 is performed until the counter n=k, wherein k relates to the number of image data values in the one-dimensional set $[v_1-v_k]$ of image data values $v_n$. The set of image data $[v_1-v_k]$ may be created by a vertical, horizontal or diagonal raster scan of a two-dimensional image bitmap.

Next, method 200 includes computing, at 204, the absolute value of the difference between image data values $v_n$ and $v_{n-1}$ to determine a first variance $d_1$, and then computing, at 206, the absolute value of the difference between image data values $v_n$ and $v_{n+1}$ to determine a second variance $d_2$. In other words, a selected image data value is compared to the image data values on each side to determine the variance between the selected image data value and those values on each side. At the first and last image data value of an image data set, which typically contains image data from a single image frame, only a single variance may be determined, as the first and last image data values of an image data set each have only one adjacent image data value.

After computing the first variance $d_1$ at 204 and the second variance $d_2$ at 206, it is next determined whether $v_n$ has a sufficiently small difference from $v_{n-1}$ or $v_{n+1}$ to warrant modification. This determination may involve several discrete steps. For example, method 200 may include determining at 208 whether either of $d_1$ and $d_2$ has a non-zero value. If both $d_1$ and $d_2$ have values of zero, this indicates that none of $v_n$, $v_{n-1}$, and $v_{n+1}$ warrants modification. Then, method 200 proceeds to 226, where it is determined whether n=k, and if not, to 228, where n is increased by one. Method 200 is then begun anew for new values of $v_n$, $v_{n-1}$ or $v_{n+1}$.

On the other hand, if it is determined at 208 that either of $d_1$ and $d_2$ have a non-zero value, then method 200 next may include determining whether to reduce the variance between $v_n$ and $v_{n-1}$, or between $v_n$ and $v_{n+1}$. This determination may be performed in any suitable manner, and may include more than one discrete process. For example, the values corresponding to the lower of the two variances may be modified to reduce the lower of the two variances to zero.

In the depicted embodiment, it is first determined whether $d_1$, or $d_2$ is a lower non-zero variance, and then whether the lower non-zero variance is sufficiently low to warrant modification of an image data value. First, at 210, it is determined whether $d_1$ is equal to zero, which would indicate that only $d_2$ has a non-zero value, and thus that $d_2$ is the variance to be examined for potential reduction. If $d_1$ has a non-zero value, then it is next determined whether $d_1$ or $d_2$ is the lower non-zero variance. First, it is determined, at 211, whether $d_2$=0. If so, this indicates that only $d_1$ has a non-zero value, and that $d_1$ is therefore the variance to be adjusted. Then it is determined, at 214, whether $d_1$ is less than the preselected variance threshold.

On the other hand, if $d_2$ is determined, at 211, not to be equal to zero, then it is next determined at 212 whether $d_1$ has a smaller value than $d_2$. If so, then it is determined, at 214, whether $d_1$ is less than the preselected variance threshold. If the inquiry at 214 is affirmative, then method 200 next includes changing, at 216, the image data value $v_n$ to be equal to the image data value $v_{n-1}$. Alternatively, the image data value $v_{n-1}$ may be changed to be equal to the image data value $v_n$. In either case, the effect is to reduce the variance $d_1$ to zero. After this image data value modification, method 200 proceeds to steps 226 and 228 to begin again at step 204 for new values of $v_n$, $v_{n-1}$, and $v_{n+1}$.

On the other hand, if it is determined at 212 that $d_1$ is less than $d_2$, and is determined at 214 that $d_1$ is greater than the preselected variance threshold, this signifies that both $d_1$ and $d_2$ are over the preselected variance threshold. In this case, none of $v_n$, $v_{n-1}$ or $v_{n+1}$ is modified, and method 200 proceeds to 226 and 228.

Furthermore, if it is determined at 210 that $d_1$ is equal to zero, or if it is determined at 212 that $d_1$ has a larger value than $d_2$, then it is next determined whether the variance $d_2$ should be reduced. This determination may be performed in any suitable manner. In the depicted embodiment, this determination involves first determining, at 218, whether $d_2$ is below the preselected variance threshold. If it is below the preselected variance threshold, then it is next determined, at 219, whether $d_1=0$. If $d_1=0$, then method 200 proceeds to 222, where $v_n$ is changed to be equal to $v_{n+1}$. If $d_1$ is not equal to zero, then it is determined, at 220, whether $d_2$ is less than $d_1$. If $d_2$ is less than $d_1$, then the image data value $v_n$ is changed to be equal to $v_{n+1}$. Alternatively, the image data value $v_{n+1}$ may be changed to be equal to the image data value $v_n$. In either case, the effect is to reduce the variance $d_2$ to zero. After this image data value modification, method 200 proceeds to steps 226 and 228 to begin again at step 204 for new values of $v_n$, $v_{n-1}$ and $v_{n+1}$.

On the other hand, if it is determined, at 218, that $d_2$ is not less than the variance threshold, then method 200 proceeds to 226 and 228 to begin again at 204 for new values of $v_n$, $v_{n-1}$ and $v_{n+1}$. Furthermore, if it is determined, at 220, that $d_2$ is not less than $d_1$, this indicates that $d_2=d_1$ and $v_n$ may be changed to equal either $v_{n-1}$ or $v_{n+1}$ (as depicted at 224). Alternatively, either of $v_{n-1}$ and $v_{n+1}$ may be changed to equal $v_n$. After either of these processes, method 200 proceeds to steps 226 and 228 to begin again at step 204 for new values of $v_n$, $v_{n-1}$, and $v_{n+1}$. In this manner, method 200 proceeds through an entire set of image data, changing at least some of the imperceptible variances in non-computer graphics image data to be zero so that the set of non-computer graphics image data more closely resembles computer graphics image data.

Figure 4:
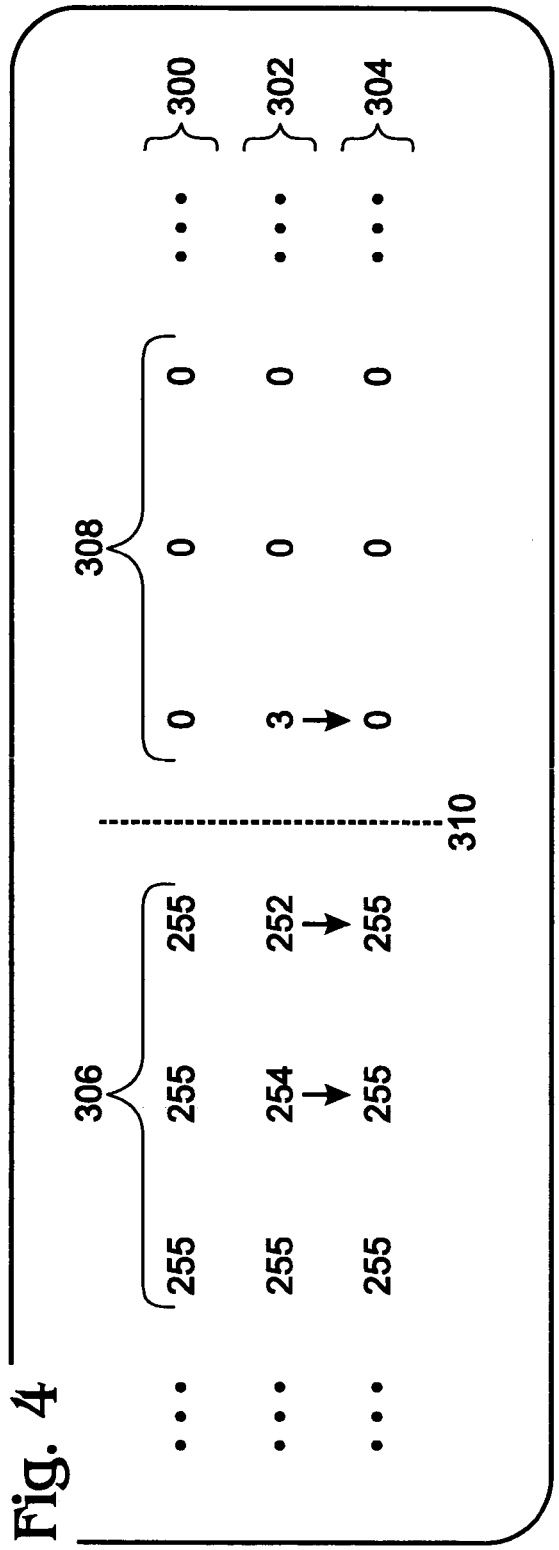
FIG. 4 is a representation of a plurality of image data values from a set of computer graphics image data, a plurality of image data values from a set of non-computer graphics image data, and a plurality of image data values from a set of modified non-computer graphics image data.

FIG. 4 shows a portion of an exemplary set of computer graphics image data at line 300, a portion of an exemplary set of non-computer graphics image data at line 302, and a portion of an exemplary set of modified non-computer graphics image data at line 304. The exemplary data values in each data set are depicted as eight-bit data values shown in integer form, but it will be appreciated that the image data may have any other suitable format. First referring to the set of computer graphics image data 300, the computer graphics image data includes a portion of a first color (or intensity, or other appearance characteristic) 306, where all of the image data have a value of 255, and a portion of a second color and/or intensity 308, where all of the image data have a value of 0. The boundary 310 between portion 306 and portion 308 is sharp, with no values intermediate 0 and 255.

In contrast, the line of non-computer graphics image data 302 includes image data values having relatively small variances from adjacent values at boundary 310. Assuming all of the small variances shown in line 302 are below the preselected variance threshold discussed above in the context of FIG. 3, then performing method 100 or method 200 on the data in line 302 changes some of the image data values to set all of the small variances to zero. Referring to line of modified non-computer graphics image data 304, after these changes are made, the set of image data has values more closely resembling line of computer graphics image data 300 than line of non-computer graphics image data 302.

Figure 5:
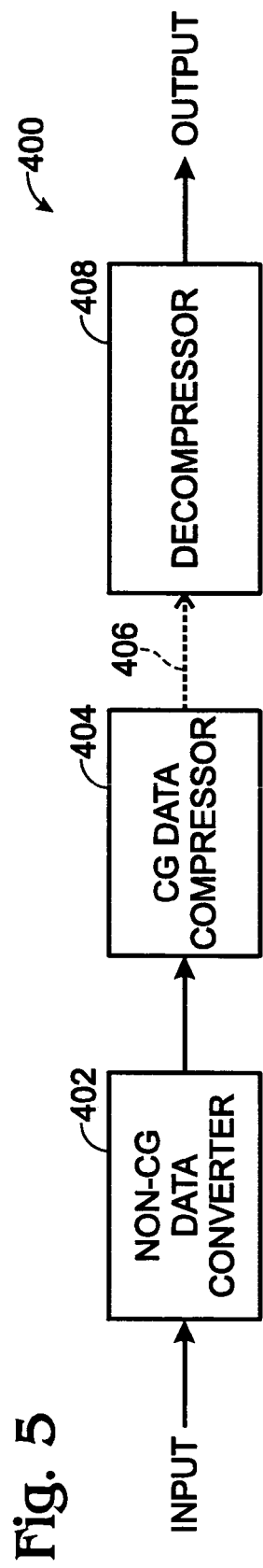
FIG. 5 is a block diagram of a portion of the embodiment of FIG. 1, showing a non-computer graphics image data converter, compressor and decompressor.

FIG. 5 shows, generally at 400, a block diagram of an exemplary architecture for a system for compressing, transmitting and decompressing image data containing both computer graphics image data and non-computer graphics image data. System 400 includes a data converter 402 configured to convert non-computer graphics image data to a form more closely resembling computer graphics image data, a data compressor 404, a communications channel 406, and a data decompressor 408. Data converter 402 may be configured to convert non-computer graphics image data in any suitable manner, including but not limited to those described above in the context of methods 100 and 200. It will be appreciated that both CG and non-CG data may be input into data converter 402. However, data converter 402 operates only non-CG data. Therefore, CG data passes through data converter 402 unmodified.

Compressor 404 utilizes a compression algorithm suited for the efficient compression of computer graphics image data. Any suitable compression algorithm may be used. Examples include, but are not limited to, LZO and other LZ family compression algorithms. Decompressor 408 is complementary to compressor 404, and may be configured perform the inverse operation or operations to those performed by compressor 404. However, decompressor 404 typically does not perform any inverse operations to those performed by data converter 402. Thus, the changes made by data converter 402 to reduce the variance in low-variance regions of the image data may contribute to the loss of some image detail. However, if the variance threshold that defines which data values are changed is selected properly, the losses caused by data converter 402 will be sufficiently small as not to be perceptible, or to be minimally perceptible.

While the embodiments described herein involve the conversion of non-computer graphics image data to a form more closely resembling computer graphics image data, it will be appreciated that the systems and method disclosed herein may be modified to convert computer graphics image data to a form more closely resembling non-computer graphics image data. In this case, both types of data may be efficiently compressed with a compressor more suited to the compression of non-computer graphics image data. Furthermore, while method 200 as described herein involves computing a first variance $d_1$ and second variance $d_2$, and then comparing the two variances to determine which image data values may be changed, it will be appreciated that a method according to the present invention may involve the computation of other variances between n image data values.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. In a computing device including memory having code stored thereon executable by a processor, a method of processing image data for compression, wherein the image data represents an image and includes a plurality of image data values, each image data value representing an appearance characteristic of a pixel of the image, the method comprising:
   receiving the image data;
   determining a variance between n image data values of the plurality of image data values;
   comparing the variance to a variance threshold to determine whether the variance meets a preselected condition relative to the variance threshold;
   if the variance meets the preselected condition, then changing at least one of the n image data values to reduce the variance; and
   transferring the image data to an image display device.

2. The method of claim 1, wherein changing at least one of n image data values includes setting at least one of the n image data values equal to another of the n image data values.

3. The method of claim 1, wherein the variance threshold corresponds to a threshold ability of a human eye to detect a difference between colors.

4. The method of claim 1, wherein the variance threshold corresponds to a threshold ability of a human eye to detect a difference between intensities.

5. The method of claim 1, wherein determining whether the variance meets a preselected condition relative to the variance threshold includes determining whether the variance is below the variance threshold.

6. The method of claim 1, wherein the image data values represent intensity values of a color component at each pixel of the image.

7. The method of claim 1, further comprising compressing the image data after changing at least one of the n image data values.

8. The method of claim 1, wherein the n image data values include a first image data value, a second image data value adjacent to the first image data value, and a third image data value adjacent to the second image data value, and wherein determining a variance between n image data values includes determining a first variance between the first image data value and the second image data value, determining a second variance between the second image data value and the third image data value, and comparing the first variance to the second variance to determine a lower non-zero variance.

9. The method of claim 8, further comprising changing the first image data value to be equal to the second image data value if the first variance is the lower non-zero variance and if the first variance is below the variance threshold.

10. The method of claim 8, further comprising changing the second image data value to be equal to the first image data value if the first variance is the lower non- zero variance and if the first variance is below the variance threshold.

11. The method of claim 8, further comprising changing the second image data value to be equal to the third image data value if the second variance is the lower non-zero variance and if the second variance is below the variance threshold.

12. The method of claim 8, further comprising changing the third image data value to be equal to the second image data value if the second variance is the lower non-zero variance and if the second variance is below the variance threshold.

13. The method of claim 1, further comprising not changing either of the first and second image data values if the variance is zero or above the variance threshold.

14. In a computing device including memory having code stored thereon executable by a processor, a method of processing image data for compression, wherein the image data represents an image and includes a plurality of image data values, each image data value representing an appearance characteristic of a pixel of the image, and wherein the image data includes computer graphics image data and non-computer graphics image data, the method comprising:
   receiving the image data;
   comparing a first image data value to an adjacent second image data value to determine a first variance;
   comparing the second image data value to an adjacent third image data value to determine a second variance;
   comparing the first variance to the second variance to determine a lower non-zero variance;
   comparing the lower non-zero variance to the variance threshold; and if the lower non-zero variance is below a preselected variance threshold,
   changing at least one of the first, second and third image data values to reduce the lower non-zero variance; and
   transferring the image data to an image display device.

15. The method of claim 14, wherein changing at least one of the first, second and third image data values includes making the first image data value and second image data value equal if the first variance is the lower non-zero variance and is below the variance threshold.

16. The method of claim 14, wherein changing at least one of the first, second and third image data values includes making the second image data value and the third image data value equal if the second variance is the lower non-zero variance and is below the variance threshold.

17. The method of claim 14, further comprising compressing the image data after comparing the lower non-zero variance to the variance threshold and, if the lower non-zero variance is below the preselected threshold, changing at least one of the first, second and third image data values.

18. The method of claim 14, wherein compressing the image data includes compressing the image data via LZO compression.

19. An apparatus including a computer readable storage medium having code stored thereon, wherein the code is executable by a computing device to perform a method of processing image data for compression, wherein the image data represents an image and includes a plurality of image data values, each image data value representing an appearance characteristic of a pixel of the image, the code including:
   code for receiving the image data;
   code for determining a variance between n image data values, wherein each image data value of the n image data values represents an appearance characteristic of pixels of the image;
   code for comparing the variance to a variance threshold to determine whether the variance meets a preselected condition relative to the variance threshold;
   code for changing at least one of the n image data values to reduce the variance between the first image data value and the second image data value if the variance meets the preselected condition; and
   code for transferring the image data to an image display device.

20. The apparatus of claim 19, wherein the code for changing at least one of the n image data values includes code for setting at least one image data value of the n image data values equal to another image data value of the n image data values.

21. The apparatus of claim 19, wherein the variance threshold corresponds to a threshold ability of a human eye to detect a difference between colors.

22. The apparatus of claim 19, wherein the code for determining whether the variance meets a preselected condition relative to the variance threshold includes code for determining whether the variance is below the preselected variance threshold.

23. The apparatus of claim 19, further comprising code for compressing the image data after changing at least one of the n image data values.

24. The apparatus of claim 19, wherein the n image data values includes a first image data value, a second image data value adjacent to the first image data value, and a third image data value adjacent to the second image data value, and wherein the variance determined between the n image data values is a lower non-zero variance of a first variance between the first image data value and the second image data value, and a second variance between the second image data value and the third image data value.

25. The apparatus of claim 24, further comprising code for changing the first image data value to be equal to the second image data value if the first variance is the lower non-zero variance and if the first variance is below the variance threshold.

26. The apparatus of claim 24, further comprising code for changing the second image data value to be equal to the first image data value if the first variance is the lower non-zero variance and if the first variance is below the variance threshold.

27. The apparatus of claim 24, further comprising code for changing the second image data value to be equal to the third image data value if the second variance is the lower non-zero variance and if the second variance is below the variance threshold.

28. The apparatus of claim 24, further comprising code for changing the third image data value to be equal to the second image data value if the second variance is the lower non-zero variance and if the second variance is below the variance threshold.

* * * * *

UNITED STATES PATENT AND TRADEMARK OFFICE
CERTIFICATE OF CORRECTION

PATENT NO.       : 7,643,182 B2                                                   Page 1 of 1
APPLICATION NO. : 11/012984
DATED            : January 5, 2010
INVENTOR(S)      : Jeff Glickman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this

Sixteenth Day of November, 2010

David J. Kappos
*Director of the United States Patent and Trademark Office*